(12) United States Patent  
Haka et al.

(10) Patent No.: US 7,458,913 B2
(45) Date of Patent: Dec. 2, 2008

(54) POWER TRANSMISSION

(75) Inventors: Raymond J. Haka, Brighton, MI (US); Joel M. Maguire, Northville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 246 days.

(21) Appl. No.: 11/172,507

(22) Filed: Jun. 30, 2005

(65) Prior Publication Data

US 2007/0004546 A1 Jan. 4, 2007

(51) Int. Cl.
*F16H 3/44* (2006.01)

(52) U.S. Cl. .................. 475/288; 475/146; 475/284

(58) Field of Classification Search .............. 475/146, 475/275, 276, 277, 280, 282, 288, 311, 284
See application file for complete search history.

(56) References Cited

U.S. PATENT DOCUMENTS

| 2,620,685 | A | * | 12/1952 | Smirl ........................ 475/124 |
| 4,152,957 | A | * | 5/1979 | Watanabe et al. ......... 74/606 R |
| 5,836,849 | A | * | 11/1998 | Mathiak et al. ............ 475/269 |
| 6,564,917 | B2 | * | 5/2003 | Katou et al. ............ 192/70.14 |
| 6,935,985 | B2 | * | 8/2005 | Ishimaru ..................... 475/296 |
| 7,201,698 | B2 | * | 4/2007 | Gumpoltsberger .......... 475/276 |

* cited by examiner

*Primary Examiner*—Roger Pang
*Assistant Examiner*—Derek D Knight

(57) ABSTRACT

A power transmission, for a vehicle, provides seven forward speeds and a reverse speed. The transmission has three planetary gearsets and has one sun gear member, which is held stationary for six of forward speeds and the reverse speed. The sun gear member is connected through a shaft to a torque-transmitting mechanism, which is disposed forward of an oil distribution snout and rearward of the vehicle engine.

8 Claims, 3 Drawing Sheets

POWER TRANSMISSION

TECHNICAL FIELD

This invention relates to multi-speed planetary transmissions and, more particularly, to the torque-transmitting mechanism arrangements within the planetary transmission.

BACKGROUND OF THE INVENTION

Planetary transmissions employ a plurality of planetary gearsets and a plurality of torque-transmitting mechanisms. The torque-transmitting mechanisms are generally fluid-operated friction discs or band-type arrangements. More commonly, they are termed clutches and brakes or reaction clutches. It is common to refer to a disc-type brake as a reaction clutch in the engineering field.

The positioning of the torque-transmitting mechanisms within the transmission arrangement is an important consideration for the overall operation and compactness of a planetary transmission. Planetary transmissions generally have a hydrodynamic drive mechanism, such as a torque converter. However, it is also known that a friction device might be used as a starting element for a power transmission. In such instances, at least one of the torque-transmitting mechanisms is engaged during launch of the vehicle in either a forward or reverse operation.

SUMMARY OF THE INVENTION

It is an object of the present invention to provide an improved multi-speed planetary transmission having a plurality of torque-transmitting mechanisms wherein at least one of the torque-transmitting mechanisms is forward of the front housing of the planetary arrangement.

In one aspect of the present invention, a sun gear member of the planetary transmission has a selectively engageable brake or reaction clutch mechanism, which is forward of the end wall of the planetary gear arrangement.

In another aspect of the present invention, a torque-transmitting mechanism for controlling the sun gear is disposed within the input shell of a power transmission and serves a starting device.

In yet another aspect of the present invention, the torque-transmitting mechanism for the sun gear is disposed in a space intermediate a fluid drive mechanism and the planetary gear arrangement forward of the end wall.

DESCRIPTION OF THE EXEMPLARY EMBODIMENTS

Figure 1:
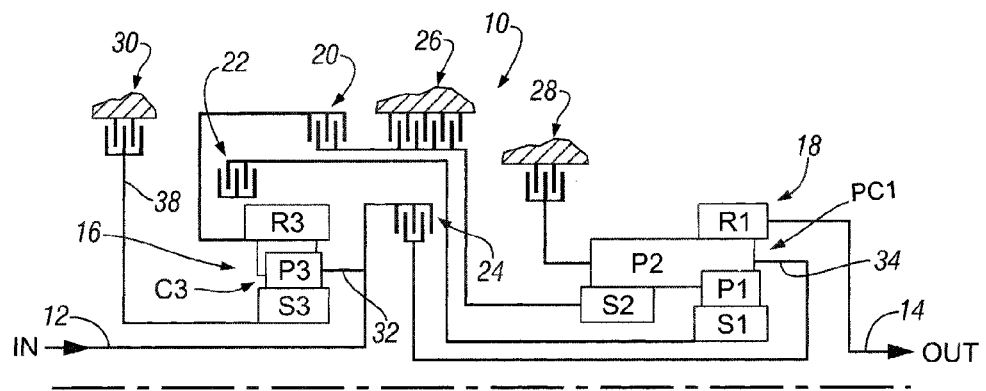
FIG. 1 is a schematic representation of a planetary transmission incorporating the present invention.

Referring to the drawings, wherein like characters represent the same or corresponding parts throughout the several views, there is seen in FIG. 1 a schematic representation of a power transmission 10 having an input shaft 12, an output shaft 14, a first planetary gearset 16, and a second planetary gearset 18.

The planetary gearsets 16 and 18 are controlled by six torque-transmitting mechanisms 20, 22, 24, 26, 28, and 30. The torque-transmitting mechanisms 20, 22, and 24 are rotating-type torque-transmitting mechanisms, commonly termed clutches, and the torque-transmitting mechanisms 26, 28, and 30 are stationary-type torque-transmitting mechanism, commonly termed brakes or reaction clutches.

The planetary gearset 16 includes a sun gear member S3, a ring gear member R3, a planetary carrier assembly C3, which includes a planet carrier 32 on which is rotatably mounted a plurality of intermeshing pinion gears P3, which mesh in turn with the sun gear member S3 and the ring gear member R3, respectively.

The planetary gearset 18 includes two sun gear members S1 and S2, a ring gear member R1, a planet carrier assembly PC1, which is comprised of a carrier member 34 on which is rotatably mounted a plurality of pinion gears P1 and P2. The pinion gear P1 meshes with the sun gear member S1 and the pinion gear P2. The pinion gear P2 meshes with the sun gear member S2 and the ring gear member R1. The planetary gearset 18 is commonly termed a Ravigneaux gearset.

The planetary gearset 16 is a compound planetary gearset in that when the carrier 32 is held stationary, the sun gear member and ring gear member will operate in the same direction of rotation when either is rotated.

The input shaft 12 is drivingly continuously connected with the planet carrier 32 and is also operatively connected with the torque-transmitting mechanism 24, which in turn is connected with the planet carrier 34. The torque-transmitting mechanism 20 is operatively connected between the ring gear R3 and the sun gear member S2 such that when the torque-transmitting mechanism 20 is engaged the planet carrier 32 and sun gear member S2 will rotate in unison.

The torque-transmitting mechanism 22 is operatively connectible between the ring gear R3 and the sun gear member S1 such that when the torque-transmitting mechanism 22 is engaged the input shaft 12, planet carrier 32, and sun gear member S1 will rotate in unison. The torque-transmitting mechanism 26 is selectively connectible with the sun gear member S2 such that when engaged, the sun gear member S2 will be held stationary. The torque-transmitting mechanism 28 is operatively connected with the planet carrier 34 such that when the torque-transmitting mechanism 28 is engaged, the planet carrier 34 will be held stationary.

The torque-transmitting mechanism 30, which is the main focus of this invention, is operatively connected with the sun gear member S3 such that when the torque-transmitting mechanism 30 is engaged, the sun gear member S3 will be held stationary. The torque-transmitting mechanism 30 is engaged in first, second, third, fourth, sixth, and seventh forward speeds as well as in the reverse speed.

The torque-transmitting mechanism 20 is engaged in first, second, third, fourth, and fifth forward speeds. The torque-transmitting mechanism 22 is engaged in the third, fifth, sixth, and reverse speeds. The torque-transmitting mechanism 24 is engaged in the fourth, fifth, sixth, and seventh forward speeds. The torque-transmitting mechanism 26 is engaged in the second and seventh forward speeds. The torque-transmitting mechanism 28 is engaged in the first forward speed and in the reverse speed.

Those skilled in the art will immediately recognize that three torque-transmitting mechanisms are engaged for each speed ratio. It will also be evident that the fifth forward speed ratio is a direct drive. The first through fourth speed ratios are underdrives, and the sixth and seventh forward speed ratios are overdrives.

The sun gear member S3 is secured or drivingly connected with a shaft 36. The shaft 36 in turn is connected with a gear hub 38 with the torque-transmitting mechanism 30, which is a stationary torque-transmitting mechanism, as previously mentioned. This type torque-transmitting mechanism also as previously mentioned is engaged in reverse, first, second, third, fourth, sixth, and seventh forward speeds.

Figure 2:
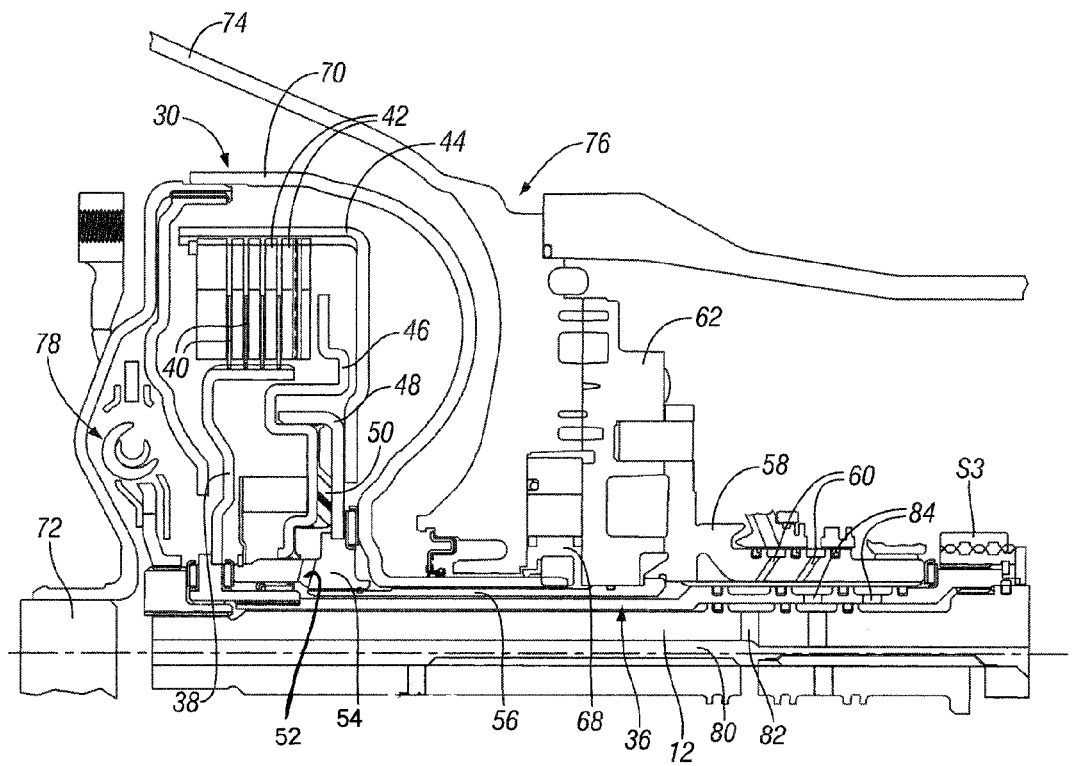
FIG. 2 is a partial elevational view in section of a planetary power transmission incorporating one embodiment of the present invention.

FIG. 2 is a partial cross-sectional view of a power transmission incorporating the present invention. Much of the planetary gearsets and the torque-transmitting mechanisms have been removed to permit clarity within the transmission structure. As seen in FIG. 2, the sun gear member S3 is connected with the shaft 36 and with the hub 38. The hub 38 is operatively connected with the torque-transmitting mechanism 30, which includes a first plurality of friction members 40 splined at the hub 38 and a second plurality of friction plates or discs 42 splined to a hub 44.

The torque-transmitting mechanism 30 also includes a piston 46, which cooperates with an extension 48 and the hub 44 to establish an apply chamber 50. The apply chamber 50 is supplied with fluid through a passage 52, which is formed in a hub 54 secured to the extension 48. The hub 54 is splined to a sleeve shaft 56, which in turn is secured to an oil snout 58. The oil snout 58 has a plurality of oil passages 60 formed therein, which are operable to supply fluid to rotating torque-transmitting mechanisms such as 20 and 22, which are rotatably supported on the oil snout 58.

The oil snout 58 receives fluid from a portion of an electromechanical transmission control 62, which receives electrical assistance from a conventional digital computer, which is preprogrammed to provide the proper sequence of torque-transmitting mechanism engagement and disengagement. The control 62 receives fluid pressure from a conventional hydraulic pump mechanism 64, which includes an input member 68 driven continuously by a hub 70, which is drivingly connected with an engine output shaft 72.

Those skilled in the art will recognize that the hub 70 is rotated in the space normally reserved for a torque converter in a conventional hydrodynamic drive. Conventionally, the hub 70 is housed within a bell housing 74 of a transmission case, generally designated 76.

The shaft 36 supports the input shaft 12 of the transmission, which is also drivingly connected through a conventional damper mechanism 78 by the engine output shaft 72. The transmission shaft 12 has fluid passages such as 80 formed therein, which supply fluid pressure through passages 82 and 84 to various components within the transmission.

With the structure shown in FIG. 2, the sun gear member S3 is held stationary by the torque-transmitting mechanism 30 when desired. The engagement and disengagement of the torque-transmitting mechanism 30 is controlled by the electromechanical control 62. The oil snout 58 is a stationary member, which will permit rotation of the shaft 36 when the torque-transmitting mechanism 30 is disengaged. As mentioned in the operation of the transmission, the torque-transmitting mechanism 30 is disengaged in the fifth forward speed ratio.

In the fifth forward speed ratio, it will be noted that both the planet carrier 32 and the ring gear R3 are driven by the input shaft 12 and therefore the sun gear S3 will also rotate at the same speed as the carrier 32 and the ring gear R3. The rotating fluid within the hub 70 will provide for lubrication and cooling of the friction plates 40 and 42 when they are disengaged.

Figure 3:
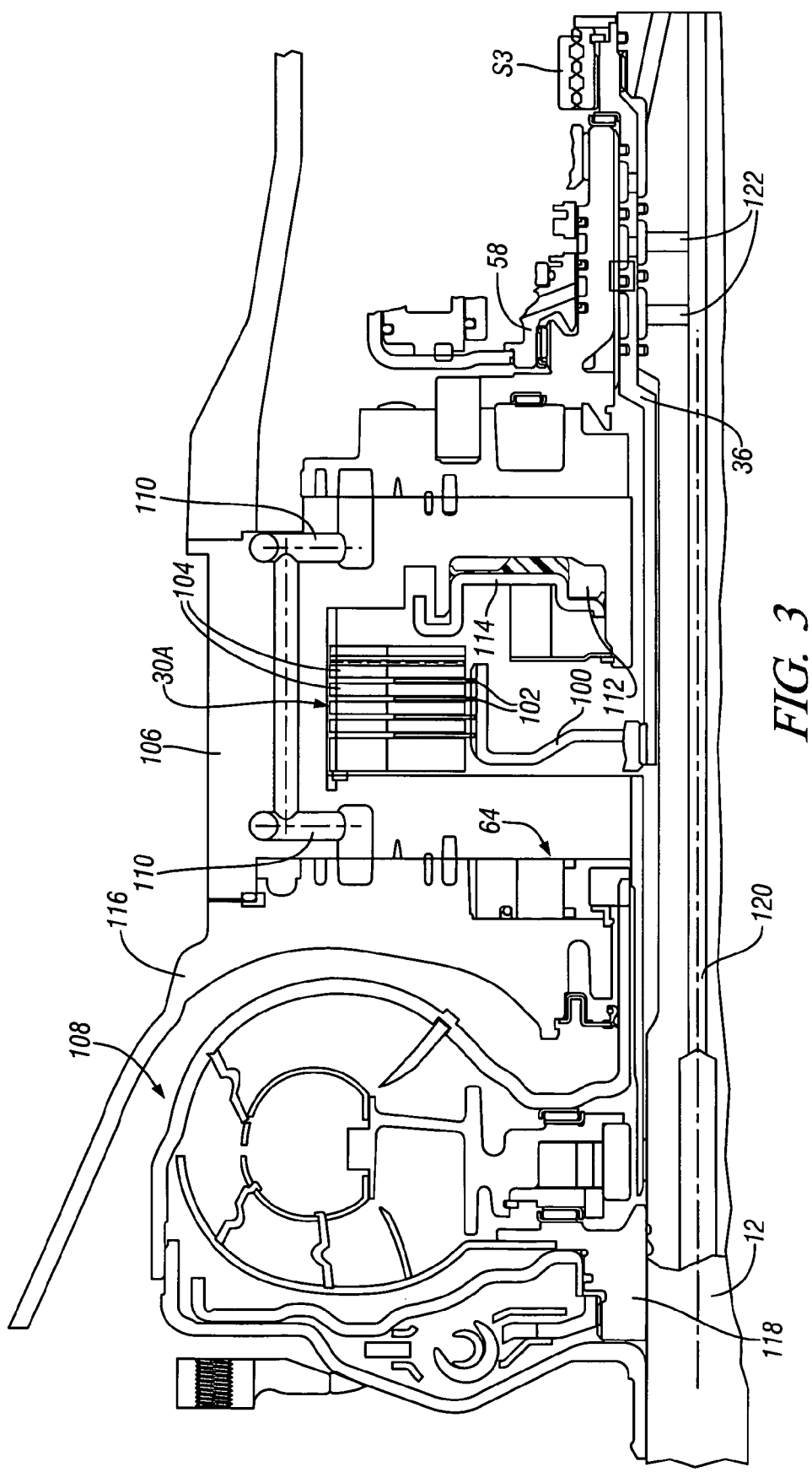
FIG. 3 is a partial elevational view of a power transmission incorporating another embodiment of the present invention.

As can be seen in FIG. 3, the sun gear member S3 is connected through the shaft 36 with a hub 100, which is a component of the torque-transmitting mechanism 30A. The torque-transmitting mechanism 30A also includes a plurality of friction discs 102, which are connected with the hub 100 and a plurality of friction discs 104, which are splined to a housing 106. The housing 106 is disposed between a torque converter assembly 108 and the electromechanical control 62. The housing 106 has passages 110 formed therein, which route oil from the hydraulic pump 64 to the control 62. The oil snout 58, which as previously mentioned in FIG. 2, distributes control fluid to some of the torque-transmitting mechanisms and also distributes some lubricating fluid. The oil snout 58 is also secured to the electromechanical control 62 and therefore grounded by the housing 106.

The torque-transmitting mechanism 30A also includes an apply piston 114, which is slidably disposed on a cavity or chamber 112 formed in the housing 106. The apply piston 112 is operable to control frictional engagement between the friction discs 102 and 104 when it is desired to engage the torque-transmitting mechanism 30A thereby holding the sun gear member S3 stationary. The shaft 36 is free to rotate whenever the torque-transmitting mechanism 30A is disengaged such as during the fifth forward speed ratio.

The torque converter 108 is housed in a conventional bell housing 116 of a power transmission and has an output driven hub 118, which connects with the transmission input shaft 12. As with the previous transmission, the input shaft 12 has a fluid passage 120, which supplies fluid through passages 122 to various components of the transmission. As with the transmission arrangement shown in FIG. 2, the sun gear member S3 is drivingly connected with the shaft 36, which is rotatably supported within the oil snout 58. The engagement of the torque-transmitting mechanism 30 has the shaft 36 and the sun gear 32 stationary, and under this condition would supply a rotatable support for the input shaft 12.

Figure 4:
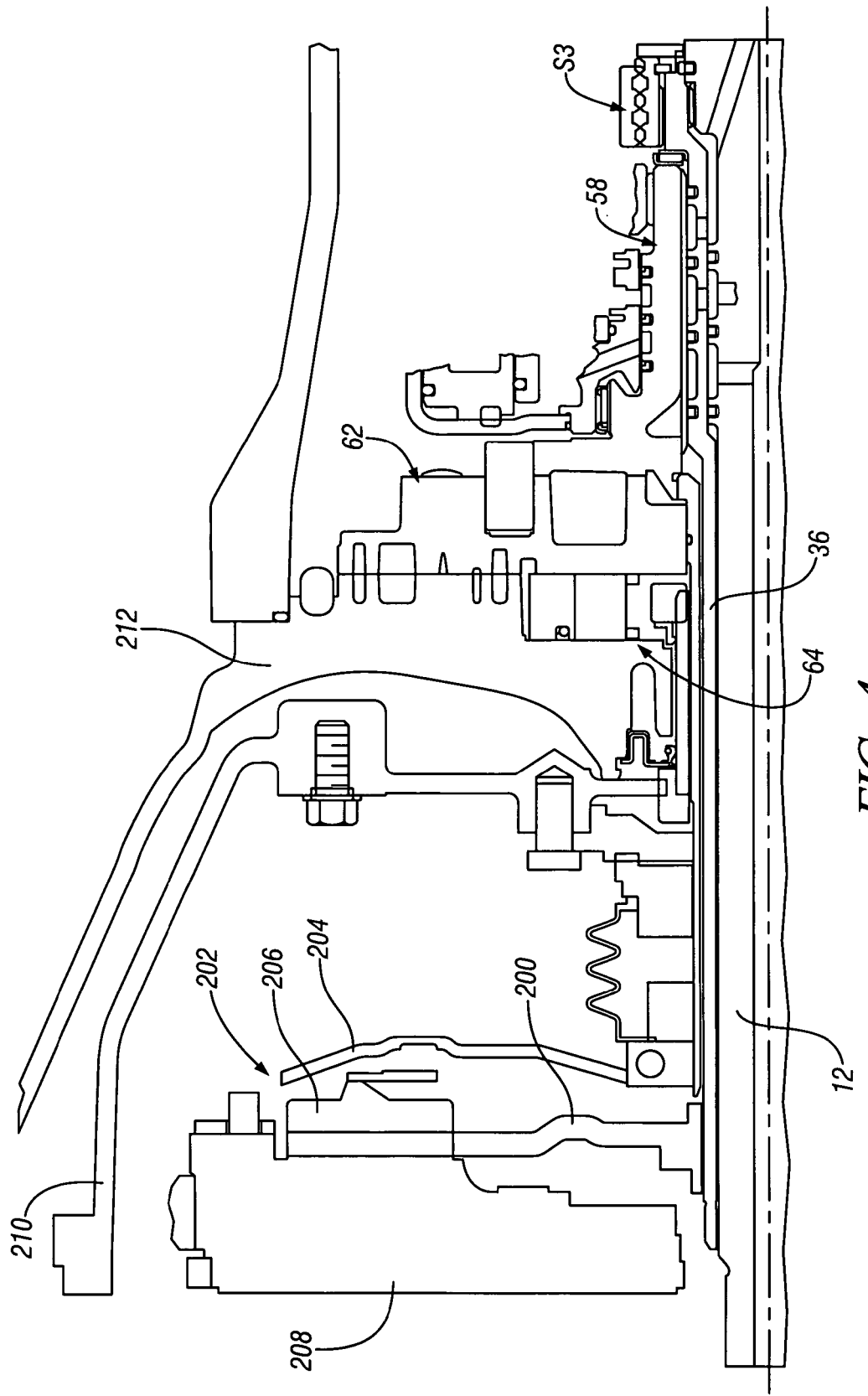
FIG. 4 is a partial elevational view of a power transmission incorporating a further embodiment of the present invention.

FIG. 4 is a further embodiment of the present invention wherein the sun gear member S3 is connected through the shaft 36 with a single disc or plate 200 of a brake 202. The brake 202 has a conventional apply brake 204, which enforces frictional engagement between a pressure plate 206 and a backing plate 208. The backing plate 208 is secured to a transmission housing 210. Thus, the plate 208 is stationary and when the plate 202 is engaged, the sun gear member S3 is held stationary. The transmission input shaft 12 is supported within the shaft 36 and, as previously mentioned for FIGS. 2 and 3, will permit the supply of some fluid to various parts of the transmission. The oil snout 58 in which the sun gear member S3 is rotatably supported is secured with the electromechanical control 62, which is secured to a stationary portion 212 of the transmission housing 210. The hydraulic pump 64 supplies fluid to the electromechanical control for distribution to various components of the transmission both through the oil snout 58 and by way of other passages within the transmission that are not shown.

The invention claimed is:

1. A power transmission comprising:

a sun gear member selectively held stationary during at least six forward speeds and one reverse speed;

a shaft member drivingly secured with said sun gear member and extending forwardly within said transmission through an oil snout and a control mechanism; and a selectively engageable torque-transmitting mechanism disposed within a space formed by a transmission bell housing and disposed forward of the oil snout, a hydraulic pump mechanism, said control mechanism and within a rotating housing in said transmission at a location generally occupied by a conventional torque converter mechanism and being selectively engageable to hold said sun gear member stationary.

2. The power transmission of claim 1 further comprising at least one fluid passage disposed in the shaft member wherein the fluid passage supplies a fluid pressure throughout the transmission.

3. The power transmission of claim 1 wherein the control mechanism is operated through an electro-mechanical means.

4. The power transmission of claim 1 wherein the selectively engageable torque-transmitting mechanism is a multiple-disc brake.

5. The power transmission of claim 1 wherein the shaft member is drivingly secured to a first hub wherein the first hub is operatively connected to the selectively engageable torque-transmitting mechanism.

6. The power transmission of claim 1 wherein the selectively engageable torque-transmitting mechanism includes a first plurality of friction members splined to the first hub.

7. The power transmission of claim 1 further comprising:
a sleeve shaft secured to the oil snout;
a second hub secured to the sleeve shaft; and
a third hub secured to the second hub; and
wherein a second plurality of friction members are splined to the third hub.

8. The power transmission of claim 1 wherein the oil snout includes at least one oil passage for providing an oil signal to a second torque-transmitting mechanism.

* * * * *